US012027079B2

(12) United States Patent
Yang et al.

(10) Patent No.: US 12,027,079 B2
(45) Date of Patent: Jul. 2, 2024

(54) SYSTEM AND METHOD FOR INSTALLING DISPLAY DEVICE

(71) Applicant: LG ELECTRONICS INC., Seoul (KR)

(72) Inventors: Dongha Yang, Seoul (KR); Kitae Kang, Seoul (KR); Dohyeon Kim, Seoul (KR); Yongnam Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 184 days.

(21) Appl. No.: 17/873,625

(22) Filed: Jul. 26, 2022

(65) Prior Publication Data

US 2023/0052729 A1 Feb. 16, 2023

(30) Foreign Application Priority Data

Aug. 11, 2021 (KR) ........................ 10-2021-0106234

(51) Int. Cl.
*G09F 7/20* (2006.01)
*G09F 7/18* (2006.01)
*G09F 9/302* (2006.01)

(52) U.S. Cl.
CPC .............. *G09F 7/20* (2013.01); *G09F 9/3023* (2013.01); *G09F 9/3026* (2013.01); *G09F 2007/1856* (2013.01)

(58) Field of Classification Search
CPC ........ G09F 7/20; G09F 9/3023; G09F 9/3026; G09F 2007/1856
See application file for complete search history.

(56) References Cited

U.S. PATENT DOCUMENTS

2017/0033154 A1* 2/2017 Lan ........................ H01L 27/156
2019/0277377 A1* 9/2019 Heo ........................ F16H 19/02
(Continued)

FOREIGN PATENT DOCUMENTS

CN 205508338 U 8/2016
EP 3 742 422 A1 11/2020
(Continued)

*Primary Examiner* — David R Dunn
*Assistant Examiner* — Christopher E Veraa
(74) *Attorney, Agent, or Firm* — Birch, Stewart, Kolasch & Birch, LLP

(57) ABSTRACT

Provided is a method for installing a display device including an operation of assembling a step adjusting module for controlling a displacement adjuster of a first cabinet onto a rear surface of the first cabinet, an operation of fastening the first cabinet to a mount on an installation surface, an operation of fastening a first display module to a front surface of the first cabinet, an operation of coupling, to the first display module and a second display module, sensor module including a first displacement sensor positioned on the front surface of the first display module and a second displacement sensor positioned on a front surface of the second display module adjacent to the first display module, a sensing operation of measuring a value of the first displacement sensor and a value of the second displacement sensor, and an adjusting operation of adjusting a gap between the first cabinet and the first display module by controlling the step adjusting module such that the value of the first displacement sensor is equal to the value of the second displacement sensor when the value of the first displacement sensor and the value of the second displacement sensor are different from each other.

17 Claims, 9 Drawing Sheets

(56) References Cited

U.S. PATENT DOCUMENTS

| | | | |
|---|---|---|---|
| 2019/0289729 | A1 | 9/2019 | Nguyen et al. |
| 2020/0064677 | A1* | 2/2020 | Yoon .................. H01R 13/6205 |
| 2020/0103068 | A1* | 4/2020 | Ahn ..................... F16M 11/043 |
| 2020/0205305 | A1* | 6/2020 | Kim ..................... H05K 5/0017 |
| 2020/0251047 | A1* | 8/2020 | Im ......................... G06F 3/1446 |
| 2020/0380895 | A1* | 12/2020 | Nakano ................. G09F 9/3026 |
| 2021/0010631 | A1 | 1/2021 | Wang et al. |
| 2021/0311684 | A1* | 10/2021 | Nussbaumer .......... F16M 11/18 |

FOREIGN PATENT DOCUMENTS

| | | | |
|---|---|---|---|
| JP | 2020-30409 | A | 2/2020 |
| KR | 10-2012-0001142 | A | 1/2012 |
| KR | 10-2189234 | B1 | 12/2020 |

* cited by examiner (a)

(b)

(a)

(b)

(a)

(b)

(a)

(b)

(a)

(a)

SYSTEM AND METHOD FOR INSTALLING DISPLAY DEVICE

This application claims the benefit of Korean Patent Application No. 10-2021-0106234, filed on Aug. 11, 2021, which is hereby incorporated by reference as when fully set forth herein.

BACKGROUND

Field

The present disclosure relates to a multi-display device installation system and a display device installation method.

Discussion of the Related Art

Digital signage, as a communication tool that may induce marketing, advertising, training effects and a customer experience of companies, a display device that provides not only broadcasting programs but also specific information in public places such as an airport, a hotel, a hospital, and a subway station.

The digital signage, as a medium that expresses various contents, commercial advertisements, and the like by installing a display device such as a liquid crystal display (LCD), a plasma display panel (PDP), an organic light emitting diode (OLED), and the like in a device in a certain outdoor place or on a street furniture, may be currently installed on any movement of a public in a place, such as an apartment elevator, a subway station, a subway, a bus, the university, a bank, a convenience store, a discount store, and a shopping mall.

When constructing a single screen using a plurality of display panels or display devices, the digital signage had a problem in that a screen is distorted due to a step between display panels neighboring in a vertical or left and right direction.

SUMMARY

The present disclosure is to solve the above problem and other problems. In addition, the present disclosure may be to provide a multi-display device installation system and a display device installation method capable of adjusting a level difference between display modules arranged to be adjacent to each other.

An aspect of the present disclosure for solving the problem described above proposes a method for installing a display device including an operation of assembling a step adjusting module for controlling a displacement adjuster of a first cabinet onto a rear surface of the first cabinet, an operation of fastening the first cabinet to a mount on an installation surface, an operation of fastening a first display module to a front surface of the first cabinet, an operation of coupling, to the first display module and a second display module, sensor module including a first displacement sensor positioned on the front surface of the first display module and a second displacement sensor positioned on a front surface of the second display module adjacent to the first display module, a sensing operation of measuring a value of the first displacement sensor and a value of the second displacement sensor, and an adjusting operation of adjusting a gap between the first cabinet and the first display module by controlling the step adjusting module such that the value of the first displacement sensor is equal to the value of the second displacement sensor when the value of the first displacement sensor and the value of the second displacement sensor are different from each other.

In one implementation, the method may further include an operation of removing the step adjusting module and the sensor module after the adjusting operation.

In one implementation, the gap between the first display module and the first cabinet may increase when the value of the first displacement sensor is greater than the value of the second displacement sensor, and the gap between the first display module and the first cabinet may decrease when the value of the first displacement sensor is smaller than the value of the second displacement sensor.

In one implementation, the display device may further include a sensing jig in which a plurality of sensor modules are embedded, and the sensor module may include a first sensor module having the first displacement sensor and the second displacement sensor arranged in a horizontal direction on the sensing jig, and a second sensor module having the first displacement sensor and the second displacement sensor arranged in a vertical direction on the sensing jig.

In one implementation, a plurality of first sensor modules may be arranged in the vertical direction on the sensing jig, and a plurality of second sensor modules may be arranged in the horizontal direction on the sensing jig.

In one implementation, the first sensor module may be located on a boundary line between the first display module and a horizontally neighboring second display module, and the second sensor module may be located on a boundary line between the first display module and a vertically neighboring second display module.

In one implementation, the sensor module may include a third sensor module including the first displacement sensor and three second displacement sensors respectively positioned in the vertical direction, the horizontal direction, and a diagonal direction.

In one implementation, the display device may include a first fastening portion positioned on a rear surface of the first display module, and a second fastening portion screwed to the first cabinet and coupled to the first fastening portion, and the displacement adjuster may include a leveling gear fastened to an end of the second fastening portion protruding toward the rear surface of the first cabinet.

In one implementation, the step adjusting module may include an adjustment gear engaged with the leveling gear, and a motor for transmitting a rotational force to the adjustment gear.

Another aspect of the present disclosure for solving the problem described above proposes a system for installing a first cabinet with a first display module coupled to a front surface of the first cabinet includes a step adjusting module for controlling a displacement adjuster of the first cabinet, a sensor module including a first displacement sensor positioned on a front surface of the first display module and a second displacement sensor positioned on a front surface of a second display module adjacent to the first display module, and a controller that adjusts a gap between the first cabinet and the first display module by controlling the step adjusting module such that a value of the first displacement sensor is equal to a value of the second displacement sensor when the value of the first displacement sensor and the value of the second displacement sensor are different from each other.

In one implementation, the gap between the first display module and the first cabinet may increase when the value of the first displacement sensor is greater than the value of the second displacement sensor, and the gap between the first display module and the first cabinet may decrease when the value of the first displacement sensor is smaller than the value of the second displacement sensor.

In one implementation, the sensor module may include a sensing jig, a first sensor module having the first displacement sensor and the second displacement sensor arranged in a horizontal direction on the sensing jig, and a second sensor module having the first displacement sensor and the second displacement sensor arranged in a vertical direction on the sensing jig.

In one implementation, a plurality of first sensor modules may be arranged in the vertical direction on the sensing jig, and a plurality of second sensor modules may be arranged in the horizontal direction on the sensing jig.

In one implementation, the first sensor module may be located on a boundary line between the first display module and a horizontally neighboring second display module, and the second sensor module may be located on a boundary line between the first display module and a vertically neighboring second display module.

In one implementation, the sensor module may include a third sensor module including the first displacement sensor and three second displacement sensors respectively positioned in the vertical direction, the horizontal direction, and a diagonal direction.

In one implementation, the system may further include a first fastening portion positioned on a rear surface of the first display module, and a second fastening portion screwed to the first cabinet and coupled to the first fastening portion, and the displacement adjuster may include a leveling gear fastened to an end of the second fastening portion protruding toward the rear surface of the first cabinet.

In one implementation, the step adjusting module may include an adjustment gear engaged with the leveling gear, and a motor for transmitting a rotational force to the adjustment gear.

According to one embodiment of the present disclosure, the level difference between the display modules arranged to be adjacent to each other may be automatically adjusted, thereby shortening the installation time.

In addition, according to one embodiment of the present disclosure, the level of the display module may be adjusted while the display module is installed on the mount, thereby compensating for errors caused by a level difference of the installation surface at once.

In addition, according to one embodiment of the present disclosure, the distortion of the displayed screen may be prevented by adjusting the level difference between the adjacent display modules.

In addition, according to one embodiment of the present disclosure, the step adjusting module and the sensor module may be used repeatedly, thereby minimizing an additional equipment cost.

Effects that may be obtained from the present disclosure are not limited to the effects mentioned above, and other effects not mentioned will be clearly understood by those of ordinary skill in the technical field to which the present disclosure belongs from a description below.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Hereinafter, a display panel will be described with a light emitting diode (LED) panel as an example, but the display panel applicable to the present disclosure is not limited to the LED panel. The display panel may also be an organic light emitting diode (OLED), a plasma display panel (PDP), a field emission display (FED), and a liquid crystal display (LCD).

Figure 1:
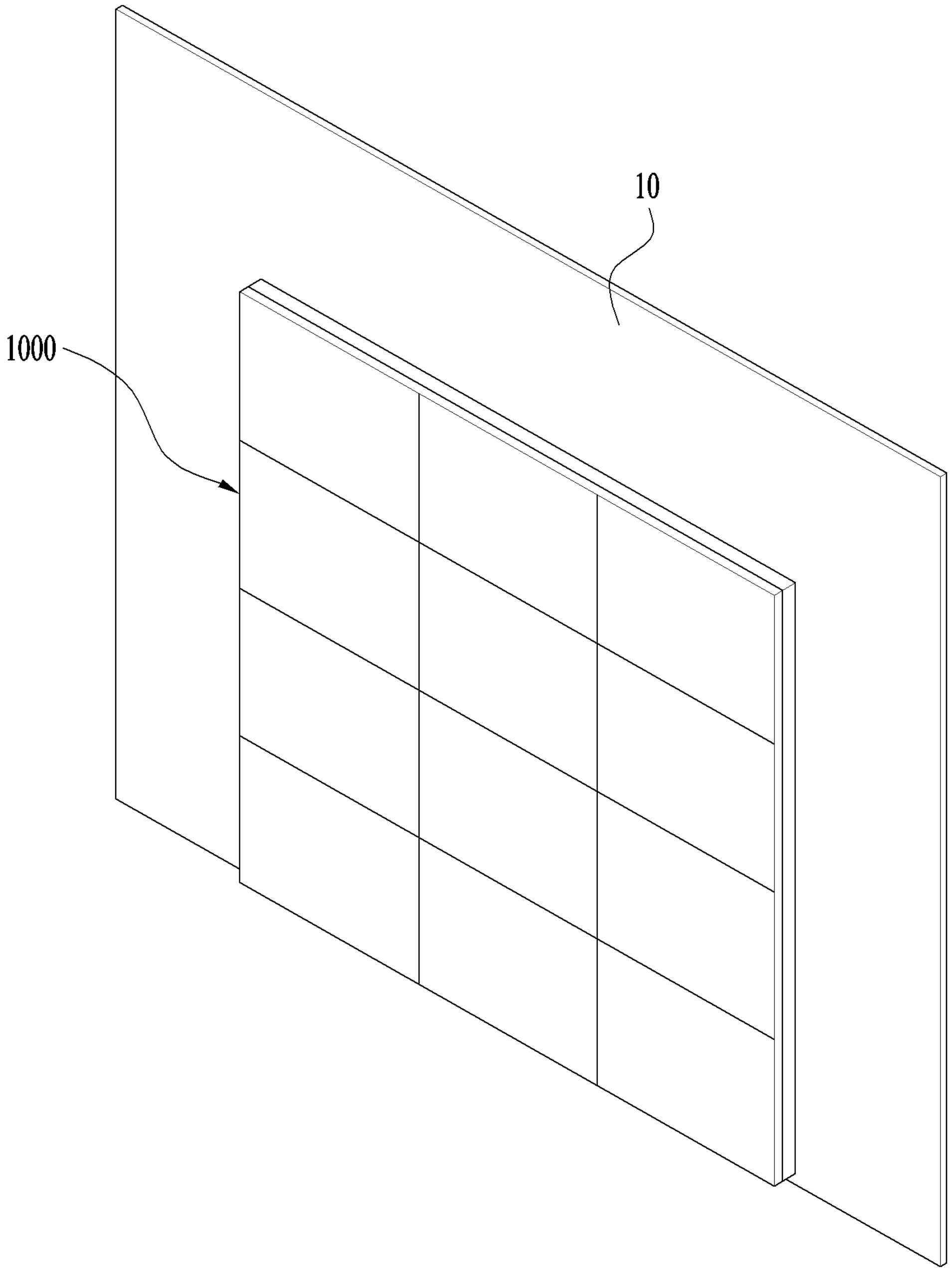
FIGS. 1 to 2 are views showing examples of a display device according to an embodiment of the present disclosure.
Figure 2:
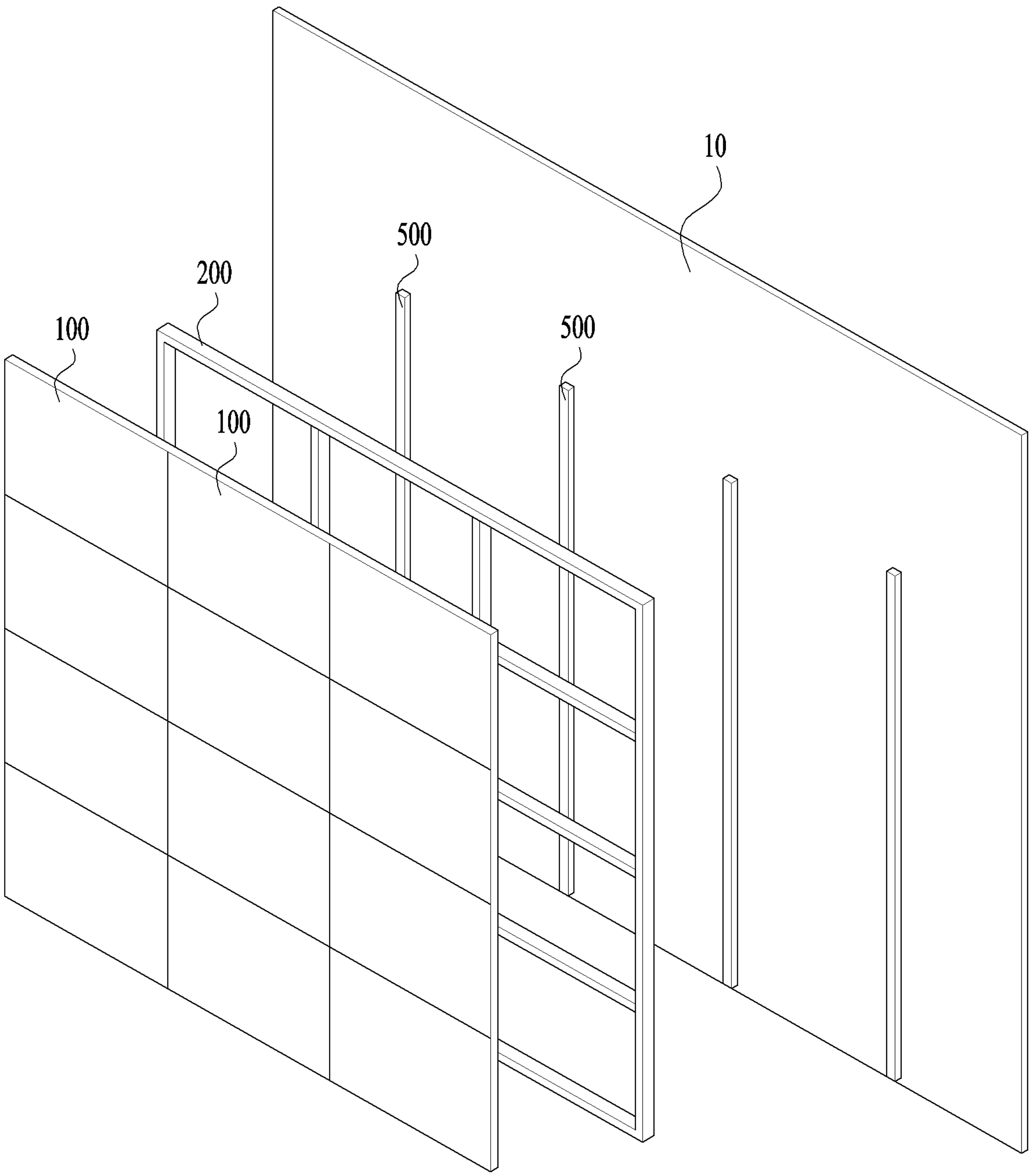

Referring to FIGS. 1 and 2, a multi-display device 1000 may be constructed by arranging a plurality of display modules 100 to implement a large screen. In order to arrange the plurality of display modules 100 in a grid shape, structures such as a cabinet 200, a mount 500, and the like are required to fix the display modules 100. When arranging the plurality of display modules 100 using such structures, care must be taken not to widen a gap between two of the plurality of display modules. In addition, generation of a line on one large screen may be prevented by arranging the plurality of display modules 100 such that horizontal levels of front surfaces of the display modules 100 are the same, that is, such that no step is generated.

The display module 100 may include a display panel and a module cover positioned at the rear of the display panel.

The display panel 101 may include a plurality of pixels R, G, and B. Each of the plurality of pixels R, G, and B may be formed in each region defined as two of multiple data lines and two of multiple gate lines intersect each other. The plurality of pixels R, G, and B may be disposed or arranged in a matrix form.

For example, the plurality of pixels R, G, and B may include a red ('R') sub-pixel, a green ('G') sub-pixel, and a blue ('B') sub-pixel. The plurality of pixels R, G, and B may further include a white (hereinafter, 'W') sub-pixel.

In the display panel 101, a side where an image is displayed may be referred to as a front side or a front surface. In the display panel 101, a side where the image cannot be observed when displaying the image may be referred to as a rear side or a rear surface. When viewing the display panel 101 from the front side or the front surface, a side on the top may be referred to as an upper side or a top surface. In the same manner, a side on the bottom may be referred to as a lower side or a bottom surface. In the same manner, a side on the right may be referred to as a right side or a right surface, and a side on the left may be referred to as a left side or a left surface.

The module cover may be disposed at the rear of the display panel 101 to protect a rear surface of the display panel 101 from the outside.

The large display device may be constructed by arranging the plurality of display modules 100 to be adjacent to each other in vertical and left and right directions.

The cabinet 200 may be disposed at the rear of the plurality of display modules 100. A front surface of the cabinet 200 may face a rear surface of the display module 100. The cabinet 200 may be disposed to correspond to the display module 100 and a thickness direction or a front and rear direction of the display module 100. Because the cabinet 200 is fastened at a perimeter of the display module 100, the cabinet 200 may be formed in a frame shape with an open central region, and may be formed in a shape including a cover to cover the rear surface of the display module 100 (see FIG. 4).

In a case of a shape covering the central region of the cabinet 200, the cabinet 200 may include a plurality of heat dissipation holes to dissipate heat of the display module 100. A thick and rigid material may be used for a perimeter of the cabinet 200 for rigidity, and the central region of the cabinet 200 may be made of a material with high thermal conductivity to be light and thin.

Figure 4:
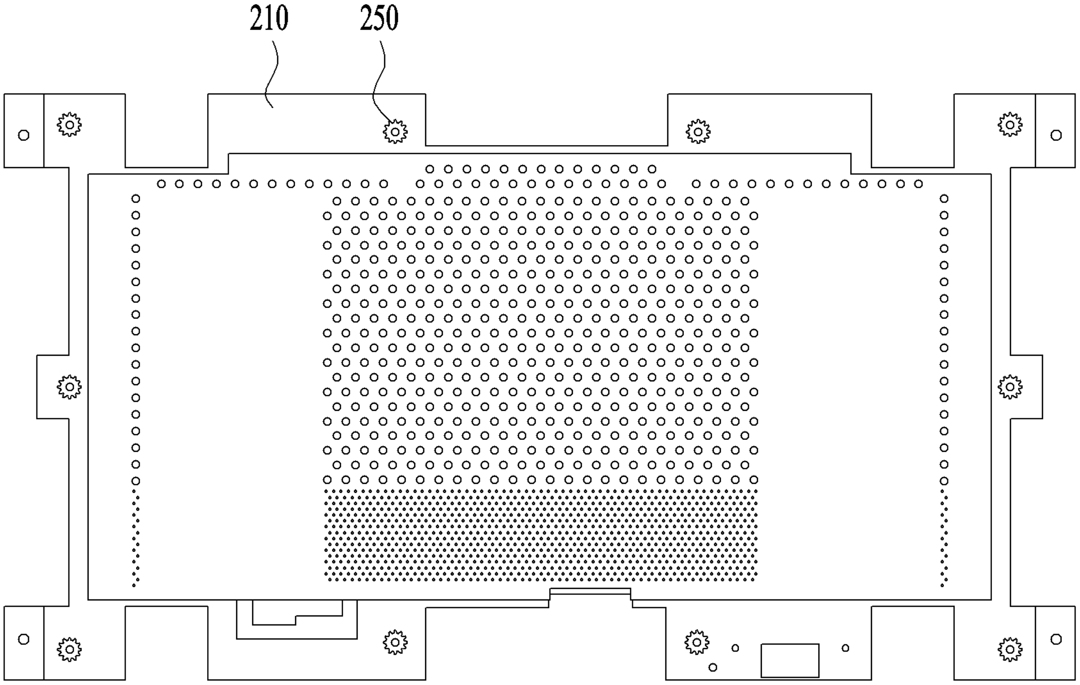
FIGS. 4 to 6 are views showing a display installation method of the present disclosure.
Figure 4:
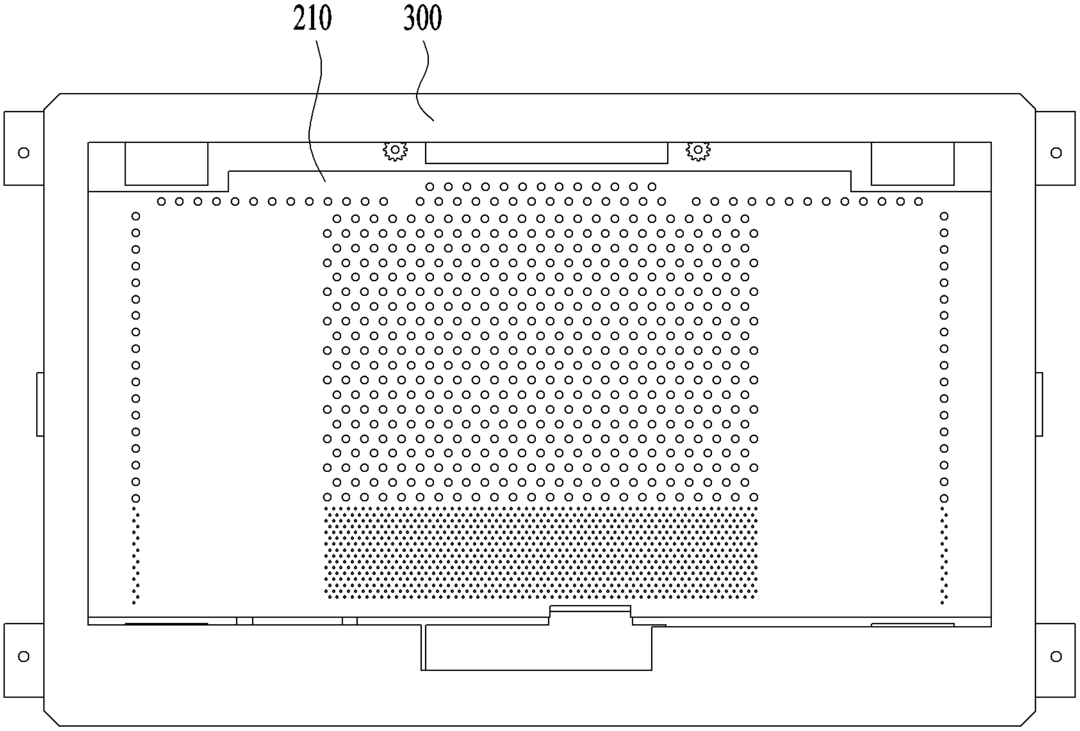

The perimeter of the cabinet 200 does not necessarily form a straight line, and only regions corresponding to fastening portions may be located at the perimeter as shown in FIG. 4. The cabinet 200 may be formed to correspond to the display module 100 or to have a small size, so that the cabinet 200 is not exposed in a direction of the front surface the display module 100.

The cabinet 200 may constitute a set with the display module 100, the cabinet may be fixed to the mount 500 fixed to an installation surface, and the display module 100 may be fixed to an installation surface 10 via the cabinet 200 and the mount 500.

Because the display module 100 is composed of the display panel and the module cover composed of several layers, thicknesses of the display modules 100 may be slightly different from each other due to a minute error of each layer and a gap difference between the layers.

The multi-display device 1000 is constructed by installing the plurality of display modules 100 on a wall rather than is came out of a factory as a finished product. Because the installation surface on which the mount is installed may be curved or uneven rather than be flat, the front surfaces of the plurality of display modules 100 may not form a uniform surface.

Therefore, even when an error of a product itself is minimized, the gap and the step between the display modules may occur when installing the display modules on the actual mounting wall.

In order to construct a single screen without heterogeneity, it is important to attach the display modules such that there is no gap between the display modules, but it is also important to arrange the display modules such that there is no step between the display modules.

In order to install the display modules 100 while adjusting the step between the display modules 100, special equipment is required when installing the display device, and a display device installation system is able to be implemented by combining such equipment. The display device installation system may include the display module 100 that may display the image, the cabinet 200 that supports the display module 100, and a displacement adjuster 250 mounted between the display module 100 and the cabinet 200 to adjust a gap therebetween. An installer may implement the display device 1000 having a flat front surface using the displacement adjuster 250.

In general, the displacement adjuster 250 is located on the rear surface of the cabinet so as not to be forwardly exposed. The installer must adjust the displacement adjuster 250 while repeatedly attaching and detaching the display module 100 to and from the cabinet in order to adjust the step between the display modules 100.

When the attachment and the detachment of the display module 100 are repeated, an installation time may increase and there may be a risk of damage to the display module 100. In addition, because the display module 100 is manually coupled to the cabinet, when the display module 100 is recombined with the cabinet 200 after adjusting the gap between the cabinet and the display module 100 with the displacement adjuster 250, a position of the display module 100 may be slightly shifted, so that the step may occur again.

In order to solve such a problem, the present disclosure may use a step adjusting module 300 for controlling the displacement adjuster 250 and a sensor module 400 for sensing the horizontal level of the front surface of the display module 100.

The installer may manually control the step adjusting module 300 based on a value measured by the sensor module 400, and the step between the display modules 100 may be more easily removed using a system composed of a controller that controls the step adjusting module 300 based on the value measured by the sensor module 400.

Figure 3:
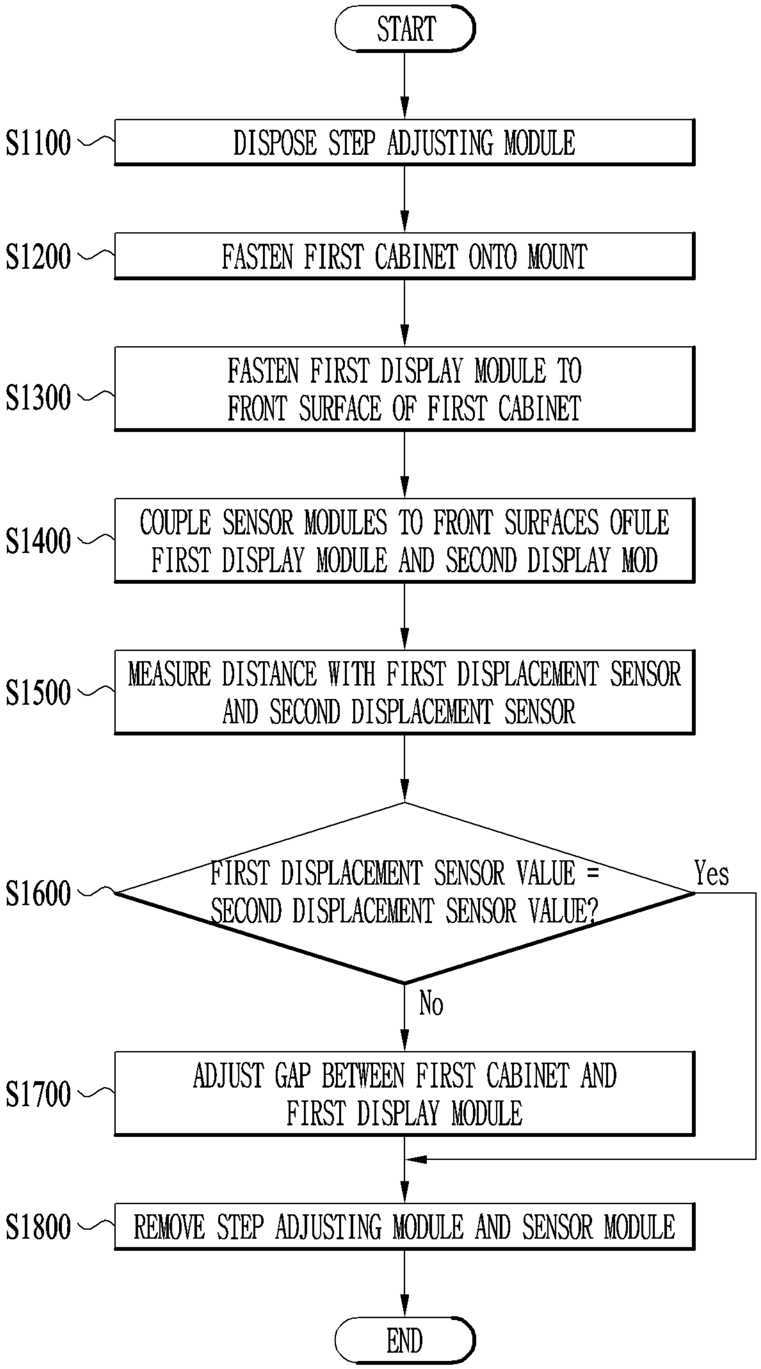
FIG. 3 is a flowchart illustrating an example of a display installation method of the present disclosure.

FIG. 3 is a flowchart illustrating an example of a display installation method of the present disclosure. The step adjusting module 300 is assembled onto a rear surface of a first cabinet 210 (S1100). The first cabinet 210 means the cabinet 200 to be installed on the installation surface, and a second cabinet 220 means the cabinet 200 already mounted on the installation surface.

The cabinet 200 may include, on the perimeter thereof, a second fastening portion 205 that is fastened with a first fastening portion 105 positioned on the perimeter of the display module 100, and the gap between the cabinet 200 and the display module 100 may be adjusted by adjusting a position of the second fastening portion 205 on the cabinet 200.

The displacement adjuster 250 may include a link gear that adjusts the position of the second fastening portion 205 on the cabinet 200 and is coupled to an end of the second fastening portion 205. The link gear may be exposed in a direction of the rear surface of the cabinet 200 as shown in (a) in FIG. 4, and the step adjusting module 300 may be coupled to the displacement adjuster 250 to control the displacement adjuster 250.

For coupling with the displacement adjuster 250 positioned on the perimeter of the cabinet 200, as shown in (b) in FIG. 4, the step adjusting module 300 may be disposed at a position corresponding to the displacement adjuster 250 on a front surface of a frame in a picture frame shape, and the step adjusting module 300 may be assembled onto the rear surface of the cabinet 200 by fixing the frame in the picture frame shape to the cabinet 200.

The first cabinet 210 may be fastened onto the mount 500 fixed on the installation surface in the state in which the step adjusting module 300 is fixed to the rear surface of the first cabinet 210 as described above (S1200). Because the display module 100 to be firstly installed is not able to adjust the step because there is no neighboring display module 100, the first cabinet 210 may mean a cabinet 200 to be installed secondly or after.

Figure 7:
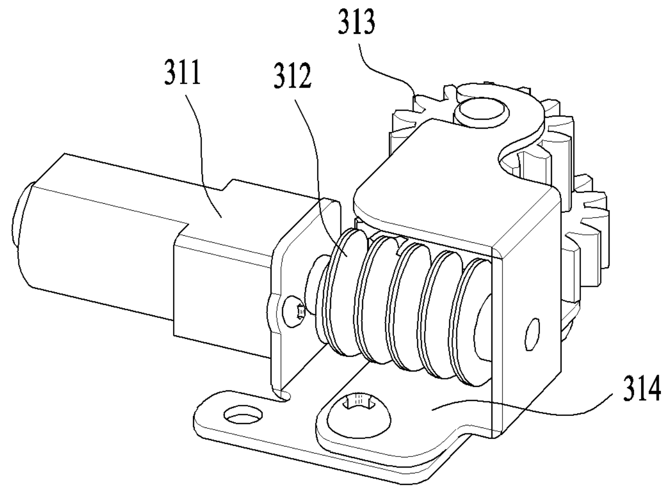
FIG. 7 is a view showing a step adjusting module of the present disclosure.
Figure 7:
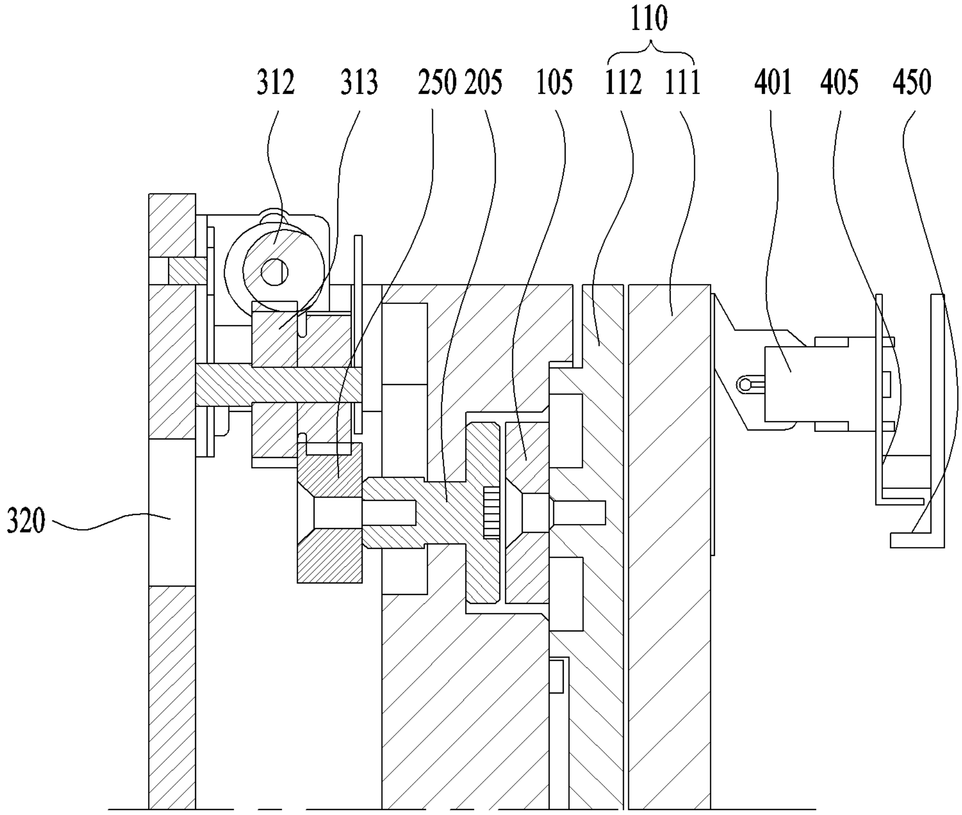

(a) in FIG. 7 is a view showing a step adjusting module. The step adjusting module includes a motor 311 that provides a rotational force and an adjustment gear 313 that rotates by receiving the rotational force of the motor 311. The adjustment gear 313 is engaged with the displacement adjuster 250 positioned on the rear surface of the first cabinet 210 as shown in (b) in FIG. 7 showing an A-A cross-section in FIG. 5. In this embodiment, the displacement adjuster 250, as a leveling gear with teeth formed on an outer surface thereof, may rotate the second fastening portion 205 that has passed through the first cabinet 210 to adjust a position of the second fastening portion 205 on the first cabinet 210 and to adjust a position in the front and rear direction of the first display module 110.

A rotation shaft of the leveling gear is in the thickness direction of the display device 1000. However, because a space from the rear surface of the first cabinet 210 to the mounting wall is limited, it is difficult to dispose a shaft of the motor 311 in parallel with the rotation shaft of the leveling gear. Therefore, the motor 311 may further include a screw gear 312 for arranging the adjusting gear 313 and the shaft thereof to be perpendicular to each other and for transmitting the rotational force of the motor 311 to the adjusting gear 313 perpendicular to the motor 311.

Figure 5:
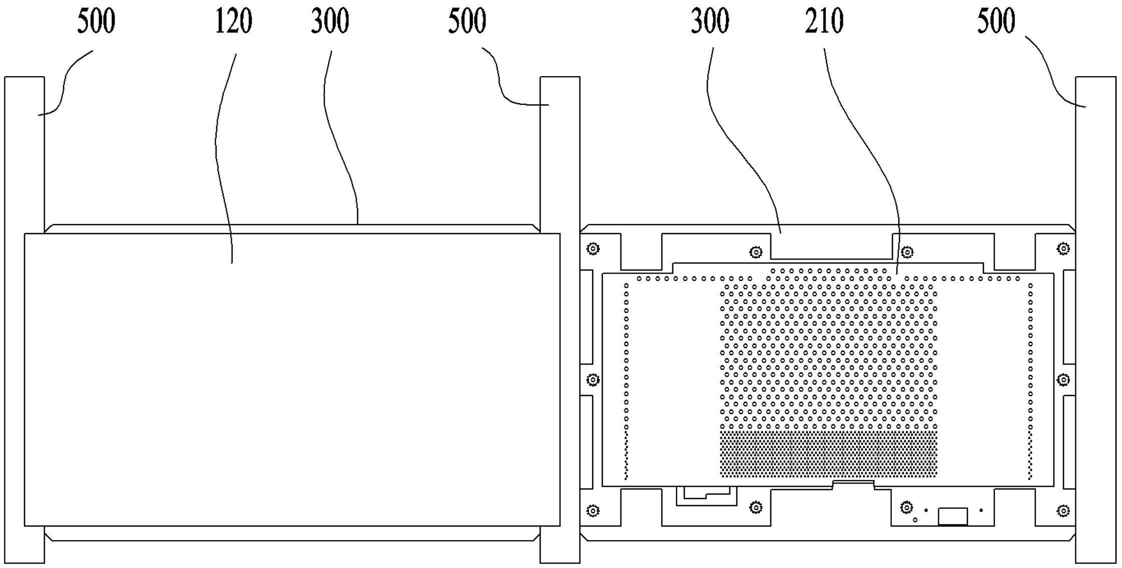
Figure 5:
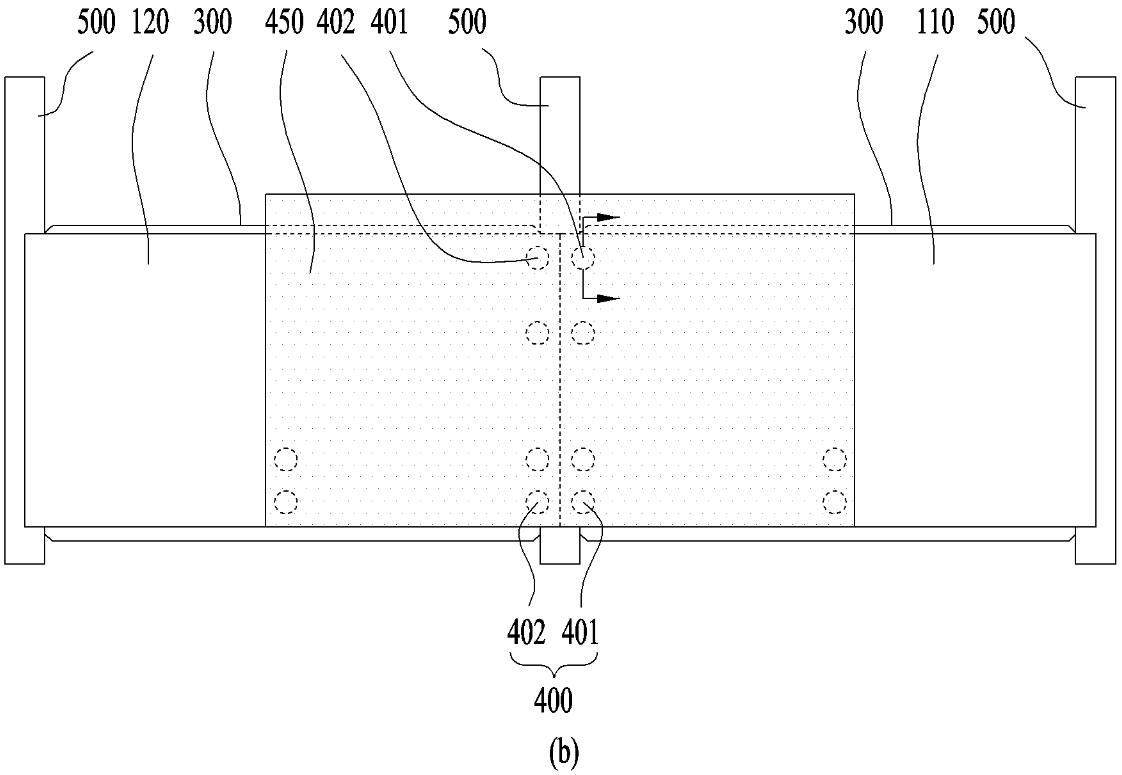

As shown in (a) in FIG. 5, the first cabinet 210 may be installed on the mount 500 with the step adjusting module 300 assembled thereto, or the step adjusting module 300 may be coupled to the first cabinet 210 after the first cabinet 210 is installed on the mount 500. The step adjusting module may be positioned between the mounts 500 arranged in the vertical direction in a bar shape so as not to overlap the mounts 500.

After fixing the first cabinet 210 to the mount 500, the first display module 110 may be attached to a front surface of the first cabinet 210 (S1300). The first display module 110 includes the first fastening portion 105 on a rear surface thereof, and the first cabinet 210 includes the second fastening portion 205 opposite to the first fastening portion 105 on a front surface thereof. As shown in (b) in FIG. 7, the first fastening portion 105 and the second fastening portion 205 may be magnetically coupled to each other. The first fastening portion 105 and the second fastening portion 205 may be made of magnets having different poles, or one of the fastening portions 105 and 205 may contain the magnet and the other may contain a metal material.

The first fastening portion 105 positioned on the rear surface of the first display module 110 is constructed to be fixed to the first display module 110 and the second fastening portion 205 positioned on the first cabinet 210 is constructed to have a variable position in the thickness direction on the first cabinet 210 to adjust a distance between the first cabinet 210 and the first display module 110.

The second fastening portion 205 is coupled to the first cabinet 210 in a screw manner. Thus, when the second fastening portion 205 is rotated, the second fastening portion 205 may move in the front and rear direction of the first cabinet 210. Because a risk of damage to the second fastening portion 205 is reduced when the second fastening portion 205 uses a material with high rigidity, the first fastening portion 105 may use the magnet and the second fastening portion 205 may use the metal material such as iron.

A front surface of the second fastening portion 205 may have a large area so as to be attached to the first fastening portion 105 and extend in a direction of the rear surface of the first cabinet 210 to extend through the first cabinet 210. The displacement adjuster 250 may be coupled to the second fastening portion 205 protruding in the direction of the rear surface of the first cabinet 210, and the second fastening portion 205 may be rotated via the displacement adjuster 250, thereby adjusting the position of the second fastening portion 205 on the first cabinet 210.

The first cabinet 210 may be fastened to the mount 500 in the state in which the first display module 110 is coupled, but the first fastening portion 105 of the first display module 110 may be installed by being magnetically coupled to the second fastening portion 205 of the first cabinet 210 after the first cabinet 210 is coupled because of the risk of damage to the first display module 110 and a convenience of work.

Figure 8:
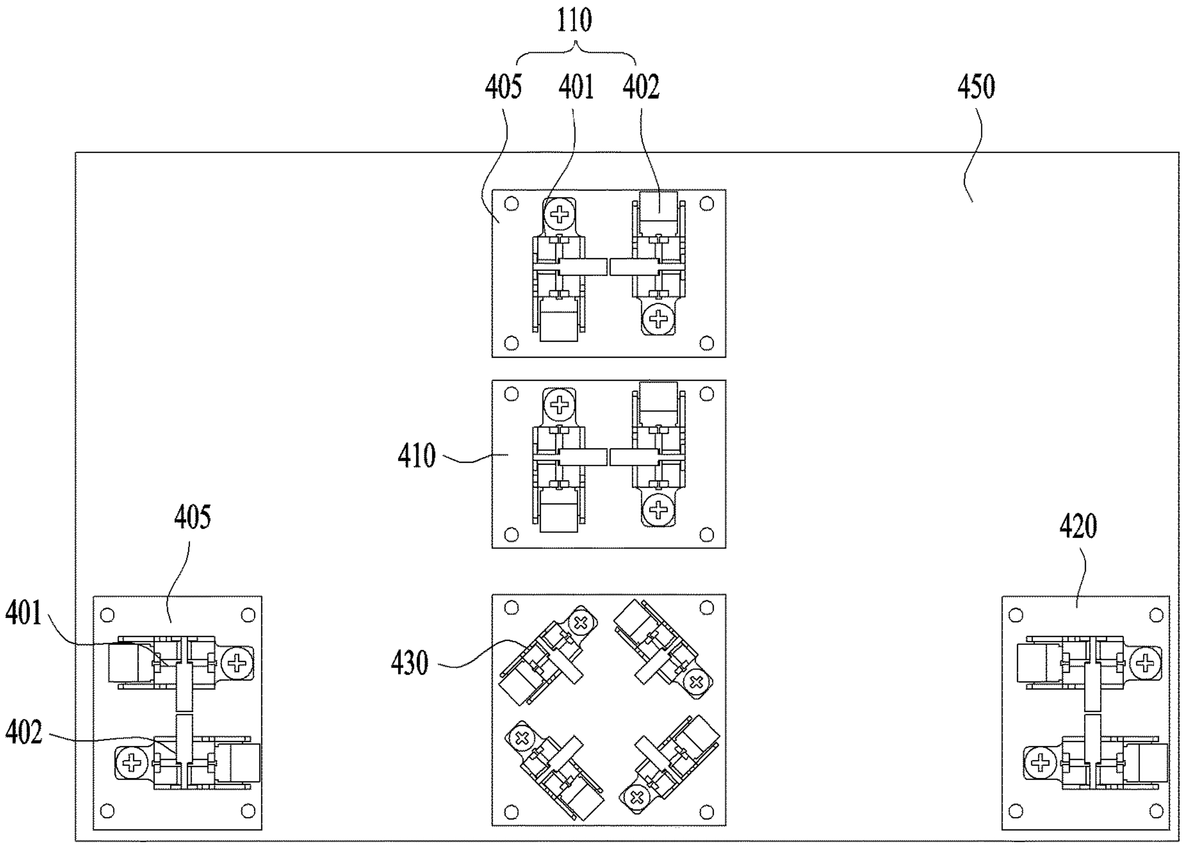
FIG. 8 is a view showing a sensor module of the present disclosure.
Figure 8:
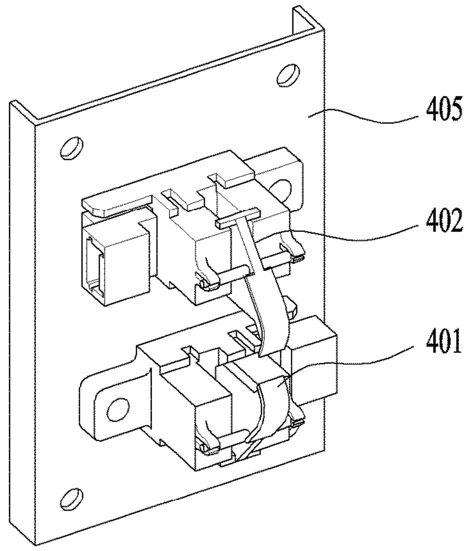

Next, the sensor modules 400 are installed on the front surfaces of the first display module 110 and the second display module 120 that is installed in advance and is adjacent to the first display module 110 (S1400). FIG. 8 is a view showing the sensor module 400 of the present disclosure. As shown in (a) in FIG. 8, the sensor module 400 includes a first displacement sensor 401 located on the front surface of the first display module 110, and a second displacement sensor 402 located on the front surface of the second display module 120, and includes a base 405 for fixing the first displacement sensor 401 and the second displacement sensor 402.

Because the display module 100 has a large area, the plurality of sensor modules 400 may be arranged along an interface between the first display module 110 and the second display module 120. Because it is difficult to couple the plurality of sensor modules 400 to the front surfaces of the first and second display modules, the plurality of sensor modules 400 may be coupled to a sensing jig 450, and the sensing jig 450 may be disposed so as to cover a boundary between the first display module 110 and the second display module 120 as shown in (b) in FIG. 5.

The sensor module 400 used when the second display module 120 is disposed laterally adjacent to the first display module 110 may be a first sensor module 410 in which the first displacement sensor and the second displacement sensor 402 are arranged side by side in a lateral direction.

In a case in which the second display module 120 and the first display module 110 are arranged in the vertical direction to be described later, a second sensor module 420 in which the first displacement sensor 401 and the second displacement sensor 402 are vertically arranged may be used. because the step may vary depending on positions of the first display module 110 and the second display module 120, the first sensor module 410 and the second sensor module 420 may respectively include a plurality of first sensor modules and a plurality of second sensor modules.

The plurality of first sensor modules 410 may be arranged side by side in the vertical direction as shown in (b) in FIG. 8, and the plurality of second sensor modules 420 may be arranged side by side in the horizontal direction.

Figure 6:
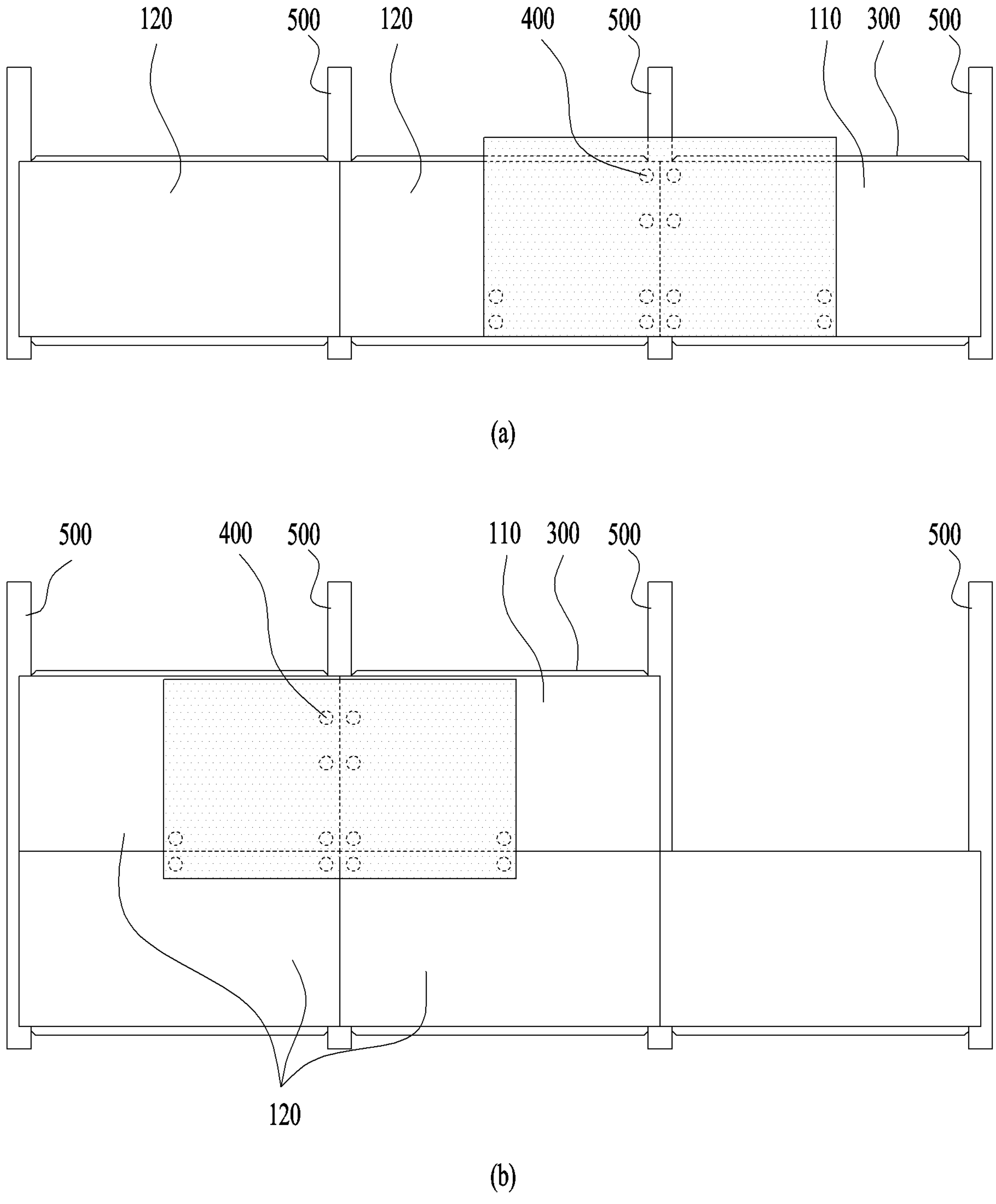

When three second display modules 120 are installed around the first display module 110 as shown in (b) in FIG. 6, the sensor module 400 including four displacement sensors may be used to adjust a horizontal level of the three display modules 100.

However, because the second display modules 120 installed in advance are in a state in which the adjustment of the horizontal level of the front surface thereof is completed, all of the second displacement sensors 402 in contact with the front surface of the second display module 120 may have the same value.

Figure 9:
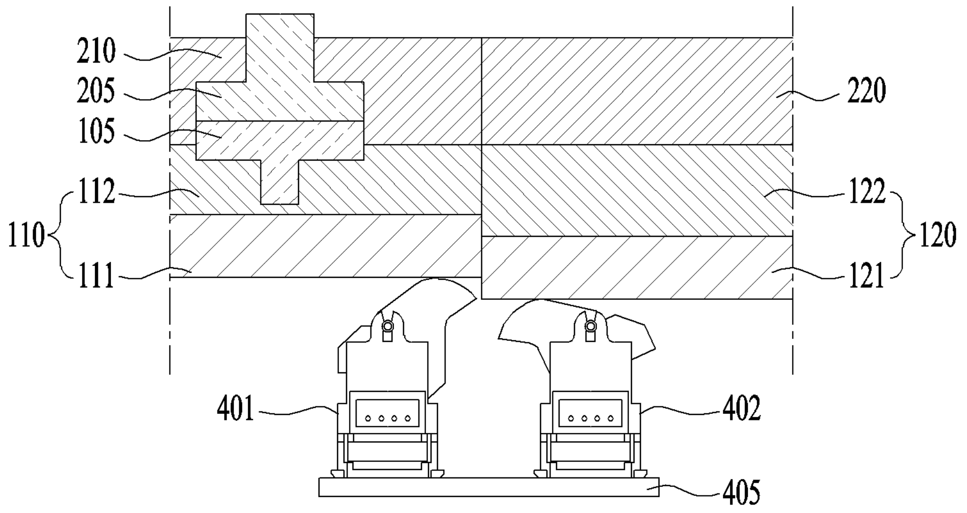
FIG. 9 is a view showing a step adjusting method using a sensor module of the present disclosure.
Figure 9:
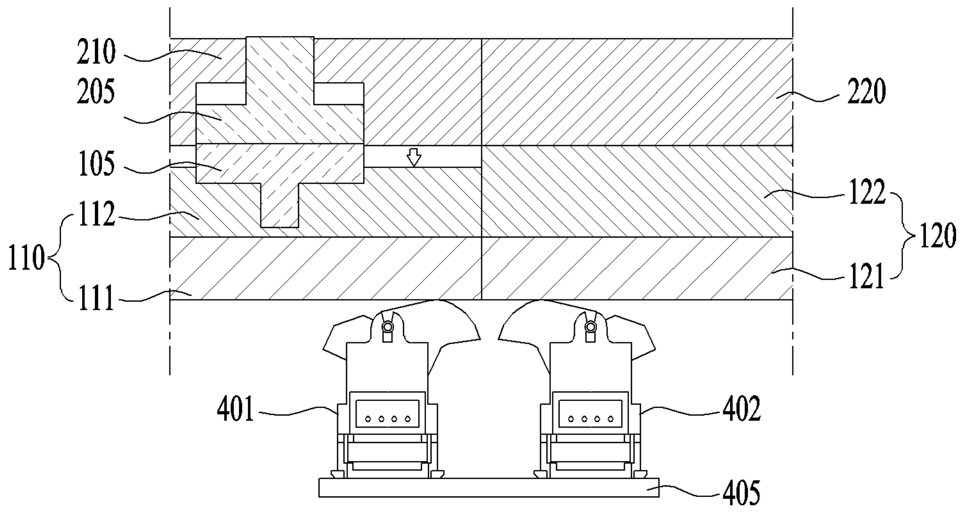

FIG. 9 is a view showing a step adjusting method using the sensor module 400 of the present disclosure. As shown in (a) in FIG. 9, the first displacement sensor 401 and the second displacement sensor 402 are arranged to be in contact with the front surface of the first display module 110 and the front surface of the second display module 120, respectively. Ends of the first displacement sensor 401 and the second displacement sensor 402 vary in a horizontal dimension and an angle depending on a surface in contact therewith. Based on a position of the end of the displacement sensor, a distance from the base 405 to the front surface of the display module 100 may be measured (S1500).

While measuring the distances from the base 405 to the ends of the first displacement sensor 401 and the second displacement sensor 402, when a value measured by the first displacement sensor 401 and a value measured by the second displacement sensor 402 are different from each other, it may be determined that the step has occurred on the front surfaces of the first display module 110 and the second display module 120.

When the measured value of the first displacement sensor 401 is the same as the measured value of the second displacement sensor 402 (S1600), the installation of the first display module 110 and the first cabinet 210 may be terminated without adjusting the position of the first display module 110 in the front and rear direction. However, when the measured value of the first displacement sensor 401 is different from the measured value of the second displacement sensor 402, by adjusting the gap between the first cabinet 210 and the first display module 110 (S1700), the step with respect to the second display module 120 may be eliminated.

However, when the first display module 110 is located rearwardly of the second display module 120 as shown in (a) in FIG. 9, the measured value of the first displacement sensor 401 is greater than the measured value of the second displacement sensor 402.

As shown in (b) in FIG. 9, the step adjusting module 300 may rotate the displacement adjuster 250 of the first cabinet 210 such that the second fastening portion 205 forwardly protrudes from the first cabinet 210 by a distance corresponding to a difference between the measured value of the second displacement sensor 402 and the measured value of the first displacement sensor 401.

When the adjustment is terminated such that the horizontal levels of the first display module 110 and the second display module 120 are the same, by removing the step adjusting module 300 and the sensor module 400 (S1800), the installation of the first display module 110 may be terminated.

As shown in FIG. 6, a new display module 100 may be sequentially disposed in the lateral or vertical direction. When sequentially adjusting the display modules 100 one by one, a step adjusting module 300 on the rear surface of the second display module 120 whose installation has been completed may be removed while only leaving a step adjusting modules 300 on the first display module 110 that is being installed.

The arrangement of the sensor modules 400 may vary depending on the position of the first display module 110, that is, the arrangement of the first display module 110 with respect to the second display modules 120. In consideration of the same, the arrangement of the sensor modules 400 fixed to the sensing jig 450 may be variously modified.

When the second sensor module 420 does not exist in the vertical direction as shown in (a) in FIG. 6, the displacement of the first display module 110 may be adjusted using only the first sensor module 410 without using the second sensor module 420. In a situation as in (b) in FIG. 6, the second sensor module 420 and a third sensor module 430 may also be used.

According to one embodiment of the present disclosure, the level difference between the display modules 100 arranged to be adjacent to each other may be automatically adjusted, thereby shortening the installation time.

In addition, according to one embodiment of the present disclosure, the level of the display module may be adjusted while the display module is installed on the mount 500, thereby compensating for errors caused by a level difference of the installation surface at once.

In addition, according to one embodiment of the present disclosure, the distortion of the displayed screen may be prevented by adjusting the level difference between the adjacent display modules 100.

In addition, according to one embodiment of the present disclosure, the step adjusting module 300 and the sensor module 400 may be used repeatedly, thereby minimizing an additional equipment cost.

The above detailed description should not be construed as being limitative in all terms, but should be considered as being illustrative. The scope of the present invention should be determined by reasonable analysis of the accompanying claims, and all changes in the equivalent range of the present invention are included in the scope of the present invention.

What is claimed is:

1. A method for installing a display device, the method comprising:

an operation of assembling a step adjusting module for controlling a displacement adjuster of a first cabinet onto a rear surface of the first cabinet;

an operation of fastening the first cabinet to a mount on an installation surface;

an operation of fastening a first display module to a front surface of the first cabinet;

an operation of coupling, to the first display module and a second display module, a sensor module including a first displacement sensor positioned on the front surface of the first display module and a second displacement sensor positioned on a front surface of the second display module adjacent to the first display module;

a sensing operation of measuring a value of the first displacement sensor and a value of the second displacement sensor; and an adjusting operation of adjusting a gap between the first cabinet and the first display module by controlling the step adjusting module such that the value of the first displacement sensor is equal to the value of the second displacement sensor when the value of the first displacement sensor and the value of the second displacement sensor are different from each other.

2. The method of claim 1, further comprising an operation of removing the step adjusting module and the sensor module after the adjusting operation.

3. The method of claim 1, wherein the gap between the first display module and the first cabinet increases when the value of the first displacement sensor is greater than the value of the second displacement sensor, wherein the gap between the first display module and the first cabinet decreases when the value of the first displacement sensor is smaller than the value of the second displacement sensor.

4. The method of claim 1, wherein the sensor module includes:

a sensing jig;

a first sensor module having the first displacement sensor and the second displacement sensor arranged in a horizontal direction on the sensing jig; and a second sensor module having the first displacement sensor and the second displacement sensor arranged in a vertical direction on the sensing jig.

5. The method of claim 4, wherein a plurality of first sensor modules are arranged in the vertical direction on the sensing jig, wherein a plurality of second sensor modules are arranged in the horizontal direction on the sensing jig.

6. The method of claim 4, wherein the first sensor module is located on a boundary line between the first display module and a horizontally neighboring second display module, wherein the second sensor module is located on a boundary line between the first display module and a vertically neighboring second display module.

7. The method of claim 4, wherein the sensor module includes a third sensor module including the first displacement sensor and three second displacement sensors respectively positioned in the vertical direction, the horizontal direction, and a diagonal direction.

8. The method of claim 1, wherein the display device includes:

a first fastening portion positioned on a rear surface of the first display module; and a second fastening portion screwed to the first cabinet and coupled to the first fastening portion, wherein the displacement adjuster includes a leveling gear fastened to an end of the second fastening portion protruding toward the rear surface of the first cabinet.

9. The method of claim 8, wherein the step adjusting module includes:

an adjustment gear engaged with the leveling gear; and a motor for transmitting a rotational force to the adjustment gear.

10. A system for installing a display device for installing a first cabinet with a first display module coupled to a front surface of the first cabinet, the system comprising:

a step adjusting module for controlling a displacement adjuster of the first cabinet;

a sensor module including a first displacement sensor positioned on a front surface of the first display module and a second displacement sensor positioned on a front surface of a second display module adjacent to the first display module; and a controller configured to adjust a gap between the first cabinet and the first display module by controlling the step adjusting module such that a value of the first displacement sensor is equal to a value of the second displacement sensor when the value of the first displacement sensor and the value of the second displacement sensor are different from each other.

11. The system of claim 10, wherein the gap between the first display module and the first cabinet increases when the value of the first displacement sensor is greater than the value of the second displacement sensor, wherein the gap between the first display module and the first cabinet decreases when the value of the first displacement sensor is smaller than the value of the second displacement sensor.

12. The system of claim 10, wherein the sensor module includes:

a sensing jig;

a first sensor module having the first displacement sensor and the second displacement sensor arranged in a horizontal direction on the sensing jig; and a second sensor module having the first displacement sensor and the second displacement sensor arranged in a vertical direction on the sensing jig.

13. The system of claim 12, wherein a plurality of first sensor modules are arranged in the vertical direction on the sensing jig, wherein a plurality of second sensor modules are arranged in the horizontal direction on the sensing jig.

14. The system of claim 12, wherein the first sensor module is located on a boundary line between the first display module and a horizontally neighboring second display module, wherein the second sensor module is located on a boundary line between the first display module and a vertically neighboring second display module.

15. The system of claim 12, wherein the sensor module includes a third sensor module including the first displacement sensor and three second displacement sensors respectively positioned in the vertical direction, the horizontal direction, and a diagonal direction.

16. The system of claim 10, further comprising:

a first fastening portion positioned on a rear surface of the first display module; and a second fastening portion screwed to the first cabinet and coupled to the first fastening portion, wherein the displacement adjuster includes a leveling gear fastened to an end of the second fastening portion protruding toward the rear surface of the first cabinet.

17. The system of claim 16, wherein the step adjusting module includes:

an adjustment gear engaged with the leveling gear; and a motor for transmitting a rotational force to the adjustment gear.

* * * * *